United States Patent [19]

Loehr et al.

[11] Patent Number: 4,747,978

[45] Date of Patent: May 31, 1988

[54] CALCIUM HYPOCHLORITE COMPOSITIONS

[75] Inventors: Clifford E. Loehr, Norton; Leo J. Paridon, Doylestown; Robert B. Simmons, Norton, all of Ohio

[73] Assignee: PPG Industries, Inc., Pittsburgh, Pa.

[21] Appl. No.: 894,167

[22] Filed: Aug. 7, 1986

[51] Int. Cl.$^4$ .......................... A01N 59/06; C02F 1/50
[52] U.S. Cl. ....................................... 252/175; 162/79; 210/721; 210/723; 210/756; 422/37; 424/149
[58] Field of Search .................. 252/175; 424/149; 162/79; 210/721, 723, 756; 422/37

[56] References Cited

U.S. PATENT DOCUMENTS

| | | | |
|---|---|---|---|
| 3,629,124 | 12/1971 | King | 252/99 |
| 3,793,216 | 2/1974 | Dychdala et al. | 252/187 |
| 3,944,383 | 3/1976 | Davis | 210/756 |
| 4,118,524 | 10/1978 | Saeman | 427/213 |
| 4,146,676 | 3/1979 | Saeman et al. | 428/403 |

FOREIGN PATENT DOCUMENTS

| | | | |
|---|---|---|---|
| 7029788 | 9/1970 | Japan | 210/756 |
| 483661 | 4/1938 | United Kingdom | 210/756 |

*Primary Examiner*—Robert Wax
*Attorney, Agent, or Firm*—Irwin M. Stein

[57] ABSTRACT

A composition of calcium hypochlorite and from about 0.1 to about 3.0 percent by weight water soluble aluminum-containing inorganic salt is provided and can be used to disinfect a water body, e.g., a swimming pool, and enhance the water clarity.

4 Claims, No Drawings

CALCIUM HYPOCHLORITE COMPOSITIONS

FIELD OF THE INVENTION

This invention relates to calcium hypochlorite compositions including an inorganic flocculant, e.g., aluminum sulfate, that can provide improved clarity upon addition to a body of water, e.g., a swimming pool.

BACKGROUND OF THE INVENTION

Calcium hypochlorite is a well known source of chlorine for sanitation purposes, for example, in disinfecting swimming pools. Granular calcium hypochlorite compositions having a $Ca(OCl)_2$ concentration of above about 65 percent by weight are commercially available and provide desired levels of available chlorine upon dissolution in a swimming pool. Swimming pools generally contain a variety of organic materials and suspended solids tht can impair the clarity of the water. Additionally, calcum hypochlorite compositions typically contain minor amounts of insoluble components such as calcium hydroxide and calcium carbonate that can further impair the clarity of the pool water. Any diminishment of clarity is naturally discomforting to a pool owner.

The use of aluminum sulfate hydrates with calcium hypochlorite is known. For example, U.S. Pat. No. 4,146,676 describes calcium hypochlorite particles coated with about 4 to 45 percent by weight of a low melting inorganic salt, e.g., aluminum sulfate hydrates, to reduce dusting during handling and to increase stability of calcium hypochlorite contacted with lighted cigarettes or reactive organic materials such as glycerine. U.S. Pat. No. 3,793,216 describes a calcium hypochlorite composition of substantially dry calcium hypochlorite and a sufficient amount of a hydrated inorganic salt, e.g., aluminum sulfate octadecahydrate, to provide the calcium hypochlorite composition with a water content within the range of about 3 to about 13 percent by weight. However, in these patents the levels of aluminum sulfate hydrates of these patents, i.e., above about 4 percent by weight, are in excess of the levels sufficient to achieve the flocculation of suspended solids and to enhance water clarity.

SUMMARY OF THE INVENTION

In accordance with the present invention, it has been found that during the disinfection of a body of water, e.g., a swimming pool, by dissolution of calcium hypochlorite including minor amounts of substantially insoluble basic materials such as calcium hydroxide and calcium carbonate, the clarity of the disinfected water can be maintained by admixing a flocculating amount of a water soluble aluminum-containing inorganic salt, e.g., aluminum sulfate or an aluminum sulfate hydrate, with the calcium hypochlorite.

In further accordance with the present invention, a composition consisting essentially of calcium hypochlorite and from about 0.1 to about 3.0 percent by weight water soluble aluminum-containing inorganic salt, basis the total weight of composition, is provided.

DETAILED DESCRIPTION OF THE INVENTION

Commercial calcium hypochlorite products or compositions generally contain at least 65 percent and occasionally up to 85 percent or more by weight of the active component, $Ca(OCl)_2$. The remaining portion of such calcium hypochlorite products may include minor components such as sodium chloride, calcium chlorate, calcium chloride, calcium hydroxide and calcium carbonate. Calcium chloride, calcium chlorate and sodium chloride readily dissolve with the active component upon addition to water. However, calcium hydroxide and calcium carbonate, which are generally present in minor amounts totaling from about 1 to 4 percent by weight of the calcium hypochlorite product, are substantially insoluble. Throughout the specification and claims the term "calcium hypochlorite" refers to a composition optionally including some or all of the minor components previously described in addition to the calcium hypochlorite.

In the disinfection of a body of water by dissolution of calcium hypochlorite therein, the substantially insoluble materials, i.e., calcium hydroxide and calcium carbonate, can result in turbidity or cloudiness for a short period of time within the water. This turbidity or diminished clarity is cosmetically undesirable in a body of water such as a swimming pool. In accordance with this invention, the clarity of the body of water can be maintained or improved during disinfection with calcium hypochlorite by adding to the water an admixture of calcium hypochlorite with a flocculating amount of a water soluble aluminum-containing inorganic salt sufficient to enhance the flocculation and settling of the insoluble materials and any organic materials or suspended solids present in the water.

Wherever "maintaining or improving the clarity" or other similar phrases are used, such phrases are meant to refer to a body of water that does not have insoluble materials suspended within the water so as to be visually observable or noticeable by an unaided human observer. The ultimate water clarity following dissolution of the calcium hypochlorite is enhanced by the present invention. Water clarity is maintained in that it is not reduced by the insoluble materials present with a calcium hypochlorite product. Water clarity is improved in that organic materials and suspended solids can be simultaneously settled by the flocculant.

The body of water can be static or can be agitated by, e.g., a pumping system. Even in static water it is contemplated that minor convective circulation may occur.

The water soluble aluminum-containing inorganic salt used as the flocculant can be selected, e.g., from among aluminum sulfate, aluminum sulfate hydrates such as aluminum sulfate octadecahydrate, aluminum potassium sulfate, aluminum potassium sulfate hydrates such as aluminum potassium sulfate dodecahydrate, aluminum sodium sulfate, aluminum sodium sulfate hydrates such as aluminum sodium sulfate dodecahydrate, aluminum ammonium sulfate, and aluminum ammonium sulfate hydrates such as aluminum ammonium sulfate dodecahydrate. Preferably, the water soluble aluminum-containing inorganic salt is aluminum sulfate or an aluminum sulfate hydrate such as aluminum sulfate octadecahydrate. Desirably, the addition of the water soluble aluminum-containing inorganic salt does not result in any other cosmetic change, e.g., foaming, within the body of water. While not wishing to be bound by any particular theory, it is believed that the flocculating amount of the water soluble aluminum-containing inorganic salt modifies the flocculation and settling characteristics of the insoluble calcium salts from the calcium hypochlorite composition, thereby minimizing turbidity from suspended material and maintaining or improving the clarity of the water.

Generally, a flocculating amount of the aluminum-containing inorganic salt can range from about 0.1 to about 3 percent by weight, basis the total weight of the calcium hypochlorite and aluminum-containing salt. Higher amounts of a water soluble aluminum-containing inorganic salt are undesirable as they produce excessive amounts of settled solids in the water. The amounts of settled solids is desirably minimized to avoid potential plugging of any filter system within a swimming pool. In the practice of the invention, a flocculating amount of the aluminum-containing inorganic salt can be admixed with the calcium hypochlorite. Such a calcium hypochlorite admixture containing an aluminum-containing inorganic salt can be readily added to a body of water for disinfection without resulting in turbidity, i.e., reduced clarity. Otherwise, the aluminum-containing inorganic salt may be added to the calcium hypochlorite-treated water separately either before or shortly after addition of the calcium hypochlorite. When added separately from the calcium hypochlorite, the aluminum-containing inorganic salt can be added as a solid or a dilute solution, preferably as a dilute solution. Preferably, the water soluble aluminum-containing inorganic salt is added to the water as an admixture with the calcium hypochlorite.

The composition of this invention consists essentially of calcium hypochlorite and from about 0.1 to about 3.0 percent by weight of a water soluble aluminum-containing inorganic salt, basis the total weight of the composition. The aluminum-containing inorganic salt of the composition can be, e.g., aluminum sulfate, an aluminum sulfate hydrate such as aluminum sulfate octadecahydrate, aluminum potassium sulfate, an aluminum potassium hydrate such as aluminum potassium sulfate dodecahydrate, aluminum sodium sulfate, an aluminum sodium sulfate such as aluminum sodium sulfate dodecahydrate, aluminum ammonium sulfate and an aluminum ammonium sulfate such as aluminum ammonium sulfate dodecahydrate. Preferably, the composition includes aluminum sulfate or an aluminum sulfate hydrate such as aluminum sulfate octadecahydrate.

Compositions in accordance with this invention can be prepared by mixing the ingredients, i.e., calcium hypochlorite and a water soluble aluminum-containing inorganic salt, e.g., aluminum sulfate or an aluminum sulfate hydrate such as aluminum sulfate octadecahydrate, in a roller mill. The ingredients can each be particulates or other shapes suitable for ready dissolution. The calcium hypochlorite composition will generally include granular calcium hypochlorite having a U.S. Screen Sieve size range from about 6 mesh to about 100 mesh.

The present invention is more particularly described in the following example which is intended as illustrative only since numerous modifications and variations will be apparent to those skilled in the art.

EXAMPLE 1

A two percent by weight solution of aluminum sulfate octadecahydrate was prepared by the addition of one gram (g) aluminum sulfate octadecahydrate to 50 milliliters (ml) of water. Freshly drawn tap water (250 ml) was added to 1.5 ml of the two percent aluminum sulfate octadecahydrate solution. Three grams of a calcium hypochlorite composition was then added in a graduated cylinder to the 250 ml of freshly drawn tap water containing the aluminum sulfate octadecahydrate and mixed well. After mixing, the graduated cylinder was allowed to stand and the flocculation and settling of insoluble materials was observed. As a control, a graduated cylinder containing 250 ml of freshly drawn tap water and 3 g of the calcium hypochlorite composition was observed in comparison. The cylinder containing the aluminum sulfate octadecahydrate was observed to have a more rapid settling rate and improved clarity in comparison to the control.

EXAMPLE 2

Five admixtures of 3 g calcium hypochlorite and aluminum sulfate octadecahydrate, varying in amounts from 0.04 g to 0.60 g were prepared. Each admixture was added to an unstirred beaker containing 500 ml of pool water and compared to a control of 3 g calcium hypochlorite. The beakers were allowed to stand and the flocculation and setting of insoluble materials and the water clarity were observed. The qualitative observations are given in Table 1 as samples A–F. In the table, aluminum sulfate octadecahydrate is referred to as alum.

Identical mixtures as in samples A–F were added to a container containing 500 ml of pool water, capped and shaken. The shaken containers were allowed to stand. Qualitative observations were made and are presented in Table 1 as samples G–L.

TABLE 1

| Sample | g of alum | wt % alum | Observations through 15 minutes |
|---|---|---|---|
| A | 0 | 0 | initially clear but water became cloudy or turbid particularly in bottom half of solution |
| B | 0.04 | 1.3 | best overall water clarity |
| C | 0.08 | 2.6 | best overall water clarity |
| D | 0.16 | 5.1 | developed large amount of floc |
| E | 0.32 | 9.6 | initially cloudy, developed large amount of floc |
| F | 0.60 | 16.7 | initially cloudiest, developed large amount of floc observation |
| G | 0 | 0 | cloudy |
| H | 0.04 | 1.3 | gradual clearing with small amount of floc |
| I | 0.08 | 2.6 | gradual clearing with small amount of floc |
| J | 0.16 | 5.1 | quicker clearing than H or I but with larger amount of floc than H or I |
| K | 0.32 | 9.6 | rapid clearing with larger amount of floc than J |
| L | 0.60 | 16.7 | very rapid clearing with larger amount of floc than K |

Generally, it was observed in the Examples that addition of aluminum sulfate octadecahydrate provided better water clarity than calcium hypochlorite alone. Further, it was observed that addition of the smaller amounts of aluminum sulfate octahydrate as in samples B, C, H and I provided the best overall combination of water clarity and minimum floc.

Although the present invention has been described with reference with specific details, it is not intended that such details should be regarded as limitations upon the scope of the invention, except as and to the extent that they are included in the accompanying claims.

We claim:

1. A composition consisting essentially of granular calcium hypochlorite and from 0.1 to about 3 percent by weight water-soluble aluminum-coating inorganic salt, basis the total weight of the composition, said aluminum containing inorganic salt being selected from the group consisting of aluminum sulfate, aluminum sulfate hydrates, aluminum sodium sulfate, aluminum sodium sulfate hydrates, aluminum potassium sulfate and aluminum potassium sulfate hydrates.

2. The composition of claim 1 wherein the inorganic salt is aluminum sulfate or aluminum sulfate octadecahydrate.

3. In the method of disinfecting swimming pool water by dissolution of calcium hypochlorite therein, said calcium hypochlorite including minor amounts of calcium hydroxide and calcium carbonate, the improvement comprising adding to the pool water granular calcium hypochlorite containing from about 0.1 to about 3.0 percent by weight water-soluble aluminum-containing inorganic salt, basis the total weight of inorganic salt and calcium hypochlorite, whereby clarity of the pool water is enhanced, said inorganic salt being selected from the group consisting of aluminum sulfate, aluminum sulfate hydrates, aluminum sodium sulfate, aluminum sodium sulfate hydrates, aluminum potassium sulfate and aluminum potassium sulfate hydrates.

4. The method of claim 3 wherein the inorganic salt is aluminum sulfate or aluminum sulfate octadecahydrate.

* * * * *